US009322966B2

(12) United States Patent
Shinto et al.

(10) Patent No.: US 9,322,966 B2
(45) Date of Patent: Apr. 26, 2016

(54) INTERFERENCE FILTER HAVING AG—BI—ND ALLOY FILM

(71) Applicant: Seiko Epson Corporation, Tokyo (JP)

(72) Inventors: Susumu Shinto, Suwa (JP); Koji Kitahara, Ina (JP); Tomonori Matsushita, Chino (JP)

(73) Assignee: Seiko Epson Corporation (JP)

( * ) Notice: Subject to any disclaimer, the term of this patent is extended or adjusted under 35 U.S.C. 154(b) by 391 days.

(21) Appl. No.: 13/742,701

(22) Filed: Jan. 16, 2013

(65) Prior Publication Data

US 2013/0181120 A1    Jul. 18, 2013

(30) Foreign Application Priority Data

Jan. 18, 2012   (JP) ................................. 2012-007819

(51) Int. Cl.
*G02B 5/28*    (2006.01)
*G01J 1/04*    (2006.01)
*G02B 5/08*    (2006.01)
*G02B 26/00*    (2006.01)

(52) U.S. Cl.
CPC ............... *G02B 5/284* (2013.01); *G01J 1/0488* (2013.01); *G02B 5/0808* (2013.01); *G02B 26/001* (2013.01)

(58) Field of Classification Search
CPC ........ G02B 5/284; G02B 5/28; G02B 5/0816; G01J 3/26
USPC .................. 250/226, 239, 216; 359/578–586; 356/519, 450–454
See application file for complete search history.

(56) References Cited

U.S. PATENT DOCUMENTS

| 8,817,267 B2* | 8/2014 | Matsushita et al. ........... 356/454 |
| 2003/0018077 A1 | 1/2003 | Billingham et al. |
| 2004/0028912 A1 | 2/2004 | Tauchi et al. |
| 2006/0093511 A1 | 5/2006 | Chen et al. |
| 2006/0169577 A1 | 8/2006 | Takagi et al. |
| 2010/0214644 A1 | 8/2010 | Cheong et al. |
| 2010/0264018 A1 | 10/2010 | Takagi et al. |
| 2011/0194118 A1 | 8/2011 | Hirokubo et al. |
| 2011/0222160 A1 | 9/2011 | Yamazaki |
| 2012/0019812 A1 | 1/2012 | Shinto et al. |
| 2012/0019827 A1 | 1/2012 | Shinto et al. |
| 2012/0044570 A1 | 2/2012 | Kitahara et al. |

FOREIGN PATENT DOCUMENTS

| EP | 2367057 A2 | 9/2011 |
| EP | 2410368 A1 | 1/2012 |

(Continued)

OTHER PUBLICATIONS

Extended European Search Report for Application No. EP 13 15 1443 dated Jul. 16, 2014 (7 pages).

*Primary Examiner* — Que T Le
(74) *Attorney, Agent, or Firm* — Harness, Dickey & Pierce, P.L.C.

(57) ABSTRACT

An interference filter includes first and second reflecting films opposed to each other across a gap, the first and second reflecting films include an Ag—Sm—Cu alloy film or an Ag—Bi—Nd alloy film, the Ag—Sm—Cu alloy film includes 0.1 atomic %≤Sm≤0.5 atomic %, and 0.1 atomic %≤Cu and ≤0.5 atomic %, and Sm+Cu≤1.0 atomic %, the Ag—Bi—Nd alloy film includes 0.1 atomic %≤Bi≤3.0 atomic %, and 0.1 atomic %≤Nd≤5.0 atomic %, and the thickness of the Ag—Sm—Cu alloy film or the Ag—Bi—Nd alloy film is ≥10 nm and ≤40 nm.

13 Claims, 8 Drawing Sheets

(56) References Cited

FOREIGN PATENT DOCUMENTS

| | | |
|---|---|---|
| EP | 2607939 A2 | 6/2013 |
| JP | 01-300202 A | 12/1989 |
| JP | 02-012218 | 1/1990 |
| JP | 11-142752 | 5/1999 |
| JP | 2003-279715 A | 10/2003 |
| JP | 2004-139712 A | 5/2004 |
| JP | 2005-036291 A | 2/2005 |
| JP | 2009-251105 | 10/2009 |
| JP | 2010-198018 A | 9/2010 |
| JP | 2011-191555 A | 9/2011 |
| JP | 2012-027224 | 2/2012 |
| JP | 2012-027226 | 2/2012 |

\* cited by examiner

INTERFERENCE FILTER HAVING AG—BI—ND ALLOY FILM

BACKGROUND

1. Technical Field

The present invention relates to an interference filter, an optical module, and an electronic apparatus.

2. Related Art

A known interference filter has reflecting films (optical films) disposed on opposed surfaces of substrates so as to be opposed to each other. Such an interference filter is provided with a pair of substrates held parallel to each other, and a pair of reflecting films formed on the pair of substrates so as to define a constant gap therebetween.

In such an interference filter, light is reflected between the pair of reflecting films, light with a specific wavelength corresponding to the gap is transmitted, and light with other wavelengths cancels each other out by interference, to thereby separate the light with the specific wavelength from the incident light.

For example, in the interference filter (a variable interference filter) disclosed in JP-A-2-12218, a metal thin film made of, for example, Au, Al, or Cu is used as a reflecting film.

To assure the spectral accuracy of the interference filter, the reflecting film should have a high reflecting property and a high transmitting property with respect to the light. Further, the reflecting property and the transmitting property should not degrade due to the temporal change.

However, the setting of the reflecting film, which fulfills the conflicting properties, namely the reflecting property and the transmitting property, and is also provided with durability, is difficult for a reflecting film formed of a metal thin film. In particular, if the transmittance of the reflecting film is low, noise is included in the detection of the transmitted light in the light detector, and thus the spectral accuracy is degraded. Therefore, a configuration of the reflecting film, which fulfills the reflecting property and the transmitting property, and keeps the spectral accuracy for a long period of time, is desired.

SUMMARY

An advantage of some aspects of embodiments of the invention is to provide a solution to at least a part of the problem described above, and the invention can be implemented in the following forms or application examples.

Application Example 1

This application example is directed to an interference filter including a pair of reflecting films opposed to each other across a gap, each of the reflecting films includes an Ag—Sm—Cu alloy film including silver (Ag), samarium (Sm), and copper (Cu), the Ag—Sm—Cu alloy film includes Sm at equal to or higher than 0.1 atomic % and equal to or lower than 0.5 atomic %, and Cu at equal to or higher than 0.1 atomic % and equal to or lower than 0.5 atomic %, a sum of the contents of Sm and Cu is equal to or lower than 1.0 atomic %, and a thickness of the Ag—Sm—Cu alloy film is equal to or larger than 10 nm and equal to or smaller than 40 nm.

The reflecting film in the interference filter has the transmitting property of transmitting the light and the reflecting property of reflecting the light, and the light which is transmitted through one of the reflecting films and enters the space between the two (the pair of) reflecting films from the outside is reflected between the reflecting films, and thus light with a specific wavelength is transmitted through one or the other of the reflecting films.

According to this present application example, in the interference filter, the reflecting films opposed to each other across the gap each include the Ag—Sm—Cu alloy film.

Further, since the Ag—Sm—Cu alloy film has the composition described above, the degradation of the characteristics due to the fabrication process or the temporal change is reduced to a low level, and the deterioration of the performance of the interference filter can more surely be suppressed. It should be noted that if the content of Sm or Cu is lower than 0.1 atomic %, the reflectance drop due to the fabrication process and the temporal change increases to a high level. If the content of Sm or Cu exceeds 0.5 atomic %, the reflectance decreases to a low level. Further, if the sum of the contents of Sm and Cu exceeds 1.0 atomic %, the reflectance decreases to a low level.

Further, since the thickness of the Ag—Sm—Cu alloy film is equal to or larger than 10 nm and equal to or smaller than 40 nm, the reflecting film has the transmitting property in addition to the reflecting property of the light, and can obtain the particularly preferable transmitting property, and can thus assure the preferable spectral accuracy of the interference filter satisfying the desired performance.

Application Example 2

In the interference filter according to the application example described above, it is preferable that each of the reflecting films is a single layer film of the Ag—Sm—Cu alloy film.

According to this configuration, since the reflecting films are each a single layer film formed of the Ag—Sm—Cu alloy film, the reflecting films each exhibit a high reflectance in a broad wavelength band in the wavelength range of visible light. It should be noted that in the application example of the invention it is assumed that the wavelength range of visible light is the range equal to or longer than 400 nm and equal to or shorter than 700 nm.

Application Example 3

In the interference filter according to the application example described above, it is preferable that there are provided a pair of substrates having a light transmitting property, and adapted to respectively support the reflecting films, each of the reflecting films includes a dielectric film and the Ag—Sm—Cu alloy film, and the dielectric film and the Ag—Sm—Cu alloy film are disposed in this order from a position near the substrate.

According to this configuration, since the reflecting films are each composed of the dielectric film and the Ag—Sm—Cu alloy film disposed in this order from the substrate side, the reflectance of the light on the short wavelength side in the wavelength range of visible light can be improved compared to the case of providing no dielectric film.

Application Example 4

In the interference filter according to the application example described above, it is preferable that each of the reflecting films includes a protective film adapted to protect the Ag—Sm—Cu alloy film.

According to this configuration, since the protective film for protecting the Ag—Sm—Cu alloy film is provided, the reflectance drop of the alloy film in the reflecting film due to the fabrication process and the temporal change is further reduced to a small level, and the performance deterioration of the interference filter is further suppressed.

Application Example 5

This application example is directed to an interference filter including a pair of reflecting films opposed to each other across a gap, each of the reflecting films includes an Ag—Bi—Nd alloy film including silver (Ag), bismuth (Bi), and neodymium (Nd), the Ag—Bi—Nd alloy film includes Bi at equal to or higher than 0.1 atomic % and equal to or lower than 3.0 atomic %, and Nd at equal to or higher than 0.1 atomic % and equal to or lower than 5.0 atomic %, and a thickness of the Ag—Bi—Nd alloy film is equal to or larger than 10 nm and equal to or smaller than 40 nm.

According to this application example, in the interference filter, the reflecting films opposed to each other across the gap each include the Ag—Bi—Nd alloy film.

Further, since the Ag—Bi—Nd alloy film has the composition described above, the degradation of the characteristics due to the fabrication process or the temporal change is reduced to a low level, and the deterioration of the performance of the interference filter can more surely be suppressed. It should be noted that if the content of Bi or Nd is lower than 0.1 atomic %, the reflectance drop due to the fabrication process and the temporal change increases to a high level. If the content of Bi exceeds 3.0 atomic %, or the content of Nd exceeds 5.0 atomic %, the reflectance decreases to a low level.

Further, since the thickness of the Ag—Bi—Nd alloy film is equal to or larger than 10 nm and equal to or smaller than 40 nm, the reflecting film has the transmitting property in addition to the reflecting property of the light, and can obtain the particularly preferable transmitting property, and can thus assure the preferable spectral accuracy of the interference filter satisfying the desired performance.

Application Example 6

In the interference filter according to the application example described above, it is preferable that each of the reflecting films is a single layer film of the Ag—Bi—Nd alloy film.

According to this configuration, since the reflecting films are each a single layer film formed of the Ag—Bi—Nd alloy film, the reflecting films each exhibit a high reflectance in a broad wavelength band in the wavelength range of visible light. It should be noted that in the application example of the invention it is assumed that the wavelength range of visible light is the range equal to or longer than 400 nm and equal to or shorter than 700 nm.

Application Example 7

In the interference filter according to the application example described above, it is preferable that there are provided a pair of substrates having a light transmitting property, and adapted to respectively support the reflecting films, each of the reflecting films includes a dielectric film and the Ag—Bi—Nd alloy film, and the dielectric film and the Ag—Bi—Nd alloy film are disposed in this order from a position near the substrate.

According to this configuration, since the reflecting films are each composed of the dielectric film and the Ag—Bi—Nd alloy film disposed in this order from the substrate side, the reflectance of the light on the short wavelength side in the wavelength range of visible light can be improved compared to the case of providing no dielectric film.

Application Example 8

In the interference filter according to the application example described above, it is preferable that each of the reflecting films includes a protective film adapted to protect the Ag—Bi—Nd alloy film.

According to this configuration, since the protective film for protecting the Ag—Bi—Nd alloy film is provided, the reflectance drop of the alloy film in the reflecting film due to the fabrication process and the temporal change is further reduced to a small level, and the performance deterioration of the interference filter is further suppressed.

Application Example 9

This application example is directed to an optical module including a pair of reflecting films opposed to each other across a gap, and a detection section adapted to detect the intensity of light transmitted through the reflecting film, each of the reflecting films includes an Ag—Sm—Cu alloy film including silver (Ag), samarium (Sm), and copper (Cu), the Ag—Sm—Cu alloy film includes Sm at equal to or higher than 0.1 atomic % and equal to or lower than 0.5 atomic %, and Cu at equal to or higher than 0.1 atomic % and equal to or lower than 0.5 atomic %, a sum of the contents of Sm and Cu is equal to or lower than 1.0 atomic %, and a thickness of the Ag—Sm—Cu alloy film is equal to or larger than 10 nm and equal to or smaller than 40 nm.

According to this optical module, the reflecting films each include the Ag—Sm—Cu alloy film with the composition described above, and have a thickness equal to or larger than 10 nm and equal to or smaller than 40 nm.

Therefore, the performance deterioration of the reflecting film is suppressed, a preferable transmitting property can be obtained, and thus an optical module which accurately detects the intensity of the light with a predetermined wavelength transmitted through the reflecting film using the detection section can be provided.

Application Example 10

This application example is directed to an optical module including a pair of reflecting films opposed to each other across a gap, and a detection section adapted to detect an intensity of light transmitted through the reflecting film, each of the reflecting films includes an Ag—Bi—Nd alloy film including silver (Ag), bismuth (Bi), and neodymium (Nd), the Ag—Bi—Nd alloy film includes Bi at equal to or higher than 0.1 atomic % and equal to or lower than 3.0 atomic %, and Nd at equal to or higher than 0.1 atomic % and equal to or lower than 5.0 atomic %, and a thickness of the Ag—Bi—Nd alloy film is equal to or larger than 10 nm and equal to or smaller than 40 nm.

According to this optical module, the reflecting films each include the Ag—Bi—Nd alloy film with the composition described above, and have a thickness equal to or larger than 10 nm and equal to or smaller than 40 nm.

Therefore, the performance deterioration of the reflecting film is suppressed, a preferable transmitting property can be obtained, and thus an optical module which accurately detects the intensity of the light with a predetermined wavelength transmitted through the reflecting film using the detection section can be provided.

Application Example 11

This application example is directed to an electronic apparatus including a pair of reflecting films opposed to each other across a gap, a detection section adapted to detect an intensity of light transmitted through the reflecting film, and a processing section adapted to perform an analysis process based on the intensity of the light detected by the detection section, each of the reflecting films includes an Ag—Sm—Cu alloy film including silver (Ag), samarium (Sm), and copper (Cu), the Ag—Sm—Cu alloy film includes Sm at equal to or higher than 0.1 atomic % and equal to or lower than 0.5 atomic %, and Cu at equal to or higher than 0.1 atomic % and equal to or lower than 0.5 atomic %, a sum of the contents of Sm and Cu is equal to or lower than 1.0 atomic %, and a thickness of the Ag—Sm—Cu alloy film is equal to or larger than 10 nm and equal to or smaller than 40 nm.

According to this electronic apparatus, the reflecting films each include the Ag—Sm—Cu alloy film with the composition described above, and have a thickness equal to or larger than 10 nm and equal to or smaller than 40 nm.

Therefore, the performance deterioration of the reflecting film is suppressed, a preferable transmitting property can be obtained, and thus the intensity of the light with a predetermined wavelength transmitted through the reflecting film can be detected using the detection section. Further, an electronic apparatus which performs accurate analysis processing based on the accurate light intensity can be provided.

Application Example 12

This application example is directed to an electronic apparatus including a pair of reflecting films opposed to each other across a gap, a detection section adapted to detect an intensity of light transmitted through the reflecting film, and a processing section adapted to perform an analysis process based on the intensity of the light detected by the detection section, each of the reflecting films includes an Ag—Bi—Nd alloy film including silver (Ag), bismuth (Bi), and neodymium (Nd), the Ag—Bi—Nd alloy film includes Bi at equal to or higher than 0.1 atomic % and equal to or lower than 3.0 atomic %, and Nd at equal to or higher than 0.1 atomic % and equal to or lower than 5.0 atomic %, and a thickness of the Ag—Bi—Nd alloy film is equal to or larger than 10 nm and equal to or smaller than 40 nm.

According to this electronic apparatus, the reflecting films each include the Ag—Bi—Nd alloy film with the composition described above, and have a thickness equal to or larger than 10 nm and equal to or smaller than 40 nm.

Therefore, the performance deterioration of the reflecting film is suppressed, a preferable transmitting property can be obtained, and thus the intensity of the light with a predetermined wavelength transmitted through the reflecting film can be detected using the detection section. Further, an electronic apparatus which performs accurate analysis processing based on the accurate light intensity can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
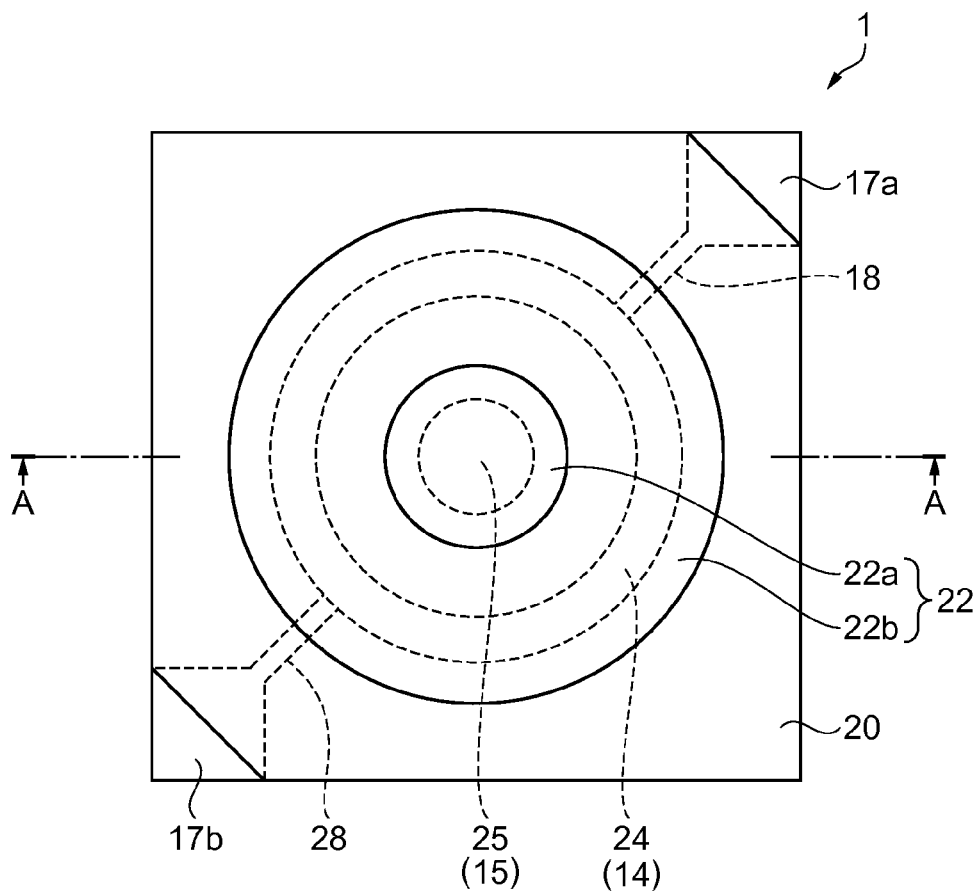
FIG. 1 is a plan view showing a schematic configuration of an etalon as an interference filter according to a first embodiment of the invention.

Hereinafter, some embodiments of the invention will be described with reference to the accompanying drawings. It should be noted that the ratio between the sizes of the respective members is appropriately altered so that each member has a size large enough to be recognized in the drawings used in the following explanations.

First Embodiment

In the present embodiment, a variable wavelength interference filter will be explained as an example of the interference filter. The variable wavelength interference filter (hereinafter also referred to as an etalon) is an interference filter which can vary a gap between the reflecting films.

Figure 2:
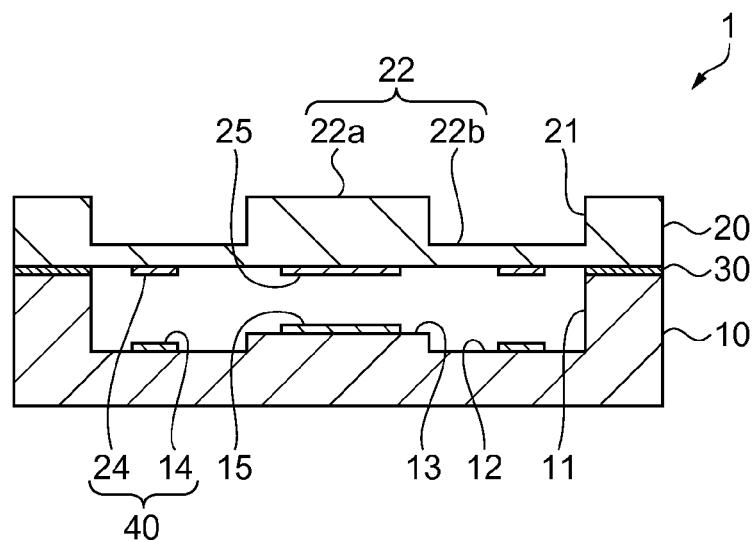
FIG. 2 is a cross-sectional view showing a schematic configuration of the first embodiment.

FIG. 1 is a plan view showing a schematic configuration of the etalon according to the present embodiment. FIG. 2 is a cross-sectional view along the A-A cutting line shown in FIG. 1.

Schematic Configuration of Etalon 1

As shown in FIG. 1, the etalon 1 is a plate-like optical member having a square shape in a plan view, and is formed to be, for example, 10 mm on a side. As shown in FIG. 2, the etalon 1 is provided with a first substrate 10 and a second substrate 20.

The first substrates 10 and the second substrate 20 are each made of a light transmissive material such as a variety of types of glass including, for example, quartz glass, soda glass, crystalline glass, lead glass, potassium glass, borosilicate glass, and alkali-free glass, or quartz crystal, and formed by etching a plate-like substrate.

Further, the etalon 1 is composed of the first substrate 10 and the second substrate 20 integrally bonded to each other. In the bonding process, fixation is performed by bonding of a bonding film 30 disposed in the bonding part between the first substrate 10 and the second substrate 20. As the bonding film 30, there is adopted a plasma-polymerized film having polyorganosiloxane as a chief material.

Further, as bonding methods other than the above, bonding with an adhesive material such as an adhesive, bonding between metal films, and so on can be used.

The first substrate 10 is formed by performing etching on a substrate having a thickness of, for example, 500 μm. The first substrate 10 is provided with a first recessed section 11 recessed to have a circular shape formed by etching.

The bottom section of the first recessed section 11 is provided with a reflecting film forming section 13 disposed at the center of the bottom section so as to project therefrom to have a columnar shape, and there is disposed an electrode forming section 12 formed around the reflecting film forming section 13 one level lower than the reflecting film forming section 13.

Further, the reflecting film forming section 13 of the first recessed section 11 is provided with a first reflecting film 15. The first reflecting film 15 has the reflecting property and the transmitting property with respect to the light, and is formed of a metal thin film of a single layer.

Further, the electrode forming section 12 is provided with a first drive electrode 14 having a ring-like shape formed so as to surround the first reflecting film 15 in a plan view. Further, the first drive electrode 14 is connected to an extraction electrode 18.

The first drive electrode 14 and the extraction electrode 18 are each a conductive film, and an indium tin oxide (ITO) film is used therefor, for example. Further, as these conductive films, it is also possible to use a Cr/Au film or the like obtained by stacking an Au film on a Cr film as a foundation layer.

The extraction electrode 18 is connected to a connection pad 17a formed on one of the four corners of the first substrate 10.

In the above, the electrical conduction of the first drive electrode 14 with the connection pad 17a is achieved via the extraction electrode 18.

The second substrate 20 is formed by using a square substrate having a thickness of, for example, 200 μm, and processing one surface of the substrate by etching.

The second substrate 20 is provided with a diaphragm 22. The diaphragm 22 is composed of a movable section 22a having a columnar shape centered on the center of the substrate, and a thin-wall section 22b, which holds the movable section 22a on the periphery thereof, and is formed to have a thickness smaller than the thickness of the movable section 22a.

In the thin-wall section 22b, the substrate is etched from the opposite surface to the surface opposed to the first substrate 10, and thus a second recessed section 21 having a ring-like shape is formed. By providing the second recessed section 21 in such a manner as described above, the thin-wall section 22b of the diaphragm 22 is formed, and it is configured so that it is easy for the movable section 22a to move in the thickness direction of the second substrate 20.

Further, on the surface of the second substrate 20, which is opposed to the first substrate 10, there are formed a second reflecting film 25 and a second drive electrode 24.

The second reflecting film 25 has the reflecting property and the transmitting property with respect to the light, and is formed on the movable section 22a so as to be opposed to the first reflecting film 15 and have a circular shape. The second reflecting film. 25 is formed of a material, which is a metal thin film of a single layer film, similarly to the first reflecting film 15.

As described above, the two reflecting films opposed to each other across a gap in the etalon 1 are formed of the first reflecting film 15 of the first substrate 10 and the second reflecting film 25 of the second substrate 20.

The second drive electrode 24 is disposed on the thin-wall section 22b opposed to the first drive electrode 14. The second electrode 24 is formed to have a ring-like shape so as to surround the second reflecting film. 25. As described above, the first drive electrode 14 of the first substrate 10 and the second drive electrode 24 of the second substrate 20 are opposed to each other, and both constitute an electrostatic actuator 40 in the etalon 1, and thus the gap size between the reflecting films can be adjusted.

Further, the second drive electrode 24 is connected to an extraction electrode 28.

The second drive electrode 24 and the extraction electrode 28 are each a conductive film, and an ITO film is used therefor, for example. Further, as these conductive films, it is also possible to use a Cr/Au film or the like obtained by stacking an Au film on a Cr film as a foundation layer.

Further, the extraction electrode 28 is connected to a connection pad 17b, which is formed on one of the four corners of the first substrate 10, with an electrically-conductive adhesive (not shown) such as Ag paste, to thereby achieve electrical conduction between the first substrate 10 and the second substrate 20.

In the etalon 1, when driving the electrostatic actuator 40 in order to vary the gap size between the first reflecting film 15 and the second reflecting film 25 opposed to each other, the first drive electrode 14 and the second drive electrode 24 are attracted to each other to thereby deflect the thin-wall section 22b of the second substrate 20, and thus the movable section 22a is displaced so as to approach the first substrate 10. The movable section 22a is provided with the second reflecting film 25, and thus the gap size between the first reflecting film 15 and the second reflecting film 25 can be adjusted. Further, the wavelength of the light emitted from the etalon 1 can be varied in accordance with the gap size between the reflecting films.

It should be noted that the etalon 1 is formed so as to have the distance between the first drive electrode 14 and the second drive electrode 24 longer than the distance between the first reflecting film 15 and the second reflecting film 25. According to such a configuration, it is possible to suppress a pull-in phenomenon that the attractive force rapidly increases when the gap size between the first drive electrode 14 and the second drive electrode 24 decreases to a very small size.

Further, although a configuration capable of adjusting the gap size between the reflecting films using the electrostatic actuator 40 is described as an example of the gap size setting section, it is also possible to adopt a configuration provided with, for example, an electromagnetic actuator having a magnet coil and a permanent magnet, or a piezoelectric element, which can expand and contract in accordance with the applied voltage.

Configuration of Reflecting Films

Next, the film configuration of the first reflecting film 15 and the second reflecting film 25 as the pair of reflecting films will be explained.

In the present embodiment, the film configuration of the first reflecting film 15 and the second reflecting film 25 as the pair of reflecting films are each a single layer film. Further, the single layer film is an Ag—Sm—Cu alloy film including silver (Ag), samarium (Sm), and copper (Cu), or an Ag—Bi—Nd alloy film including silver (Ag), bismuth (Bi), and neodymium (Nd).

Here, the Ag—Sm—Cu alloy film is composed substantially of silver (Ag), samarium (Sm), and copper (Cu).

The Ag—Bi—Nd alloy film is composed substantially of silver (Ag), bismuth (Bi), and neodymium (Nd).

If the first reflecting film 15 and the second reflecting film 25 are each formed of the Ag—Sm—Cu alloy film, it is preferable that the Ag—Sm—Cu alloy film includes Sm at equal to or higher than 0.1 atomic % and equal to or lower than 0.5 atomic %, and Cu at equal to or higher than 0.1 atomic % and equal to or lower than 0.5 atomic %, and the sum of Sm and Cu is equal to or lower than 1.0 atomic %. If the content of Sm or Cu is lower than 0.1 atomic %, the reflectance drop due to the fabrication process and the temporal change increases to a high level. If the content of Sm or Cu exceeds 0.5 atomic %, the reflectance decreases to a low level. If the sum of the Sm and Cu exceeds 1.0 atomic %, the reflectance decreases to a low level. It should be noted that the remainder is substantially Ag, but can also include a small amount of an impurity element (e.g., oxygen, nitrogen, or carbon).

Further, in the case in which the first reflecting film 15 and the second reflecting film 25 are each formed of the Ag—Bi—Nd alloy film, it is preferable for the alloy film to include Bi at equal to or higher than 0.1 atomic % and equal to or lower than 3.0 atomic %, and Nd at equal to or higher than 0.1 atomic % and equal to or lower than 5.0 atomic %. More preferably, Bi is included at equal to or higher than 0.1 atomic % and equal to or lower than 2.0 atomic %, and Nd is included at equal to or higher than 0.1 atomic % and equal to or lower than 3.0 atomic %. If the content of Bi or Nd is lower than 0.1 atomic %, the reflectance drop due to the fabrication process and the temporal change increases to a high level. If the content of Bi exceeds 3.0 atomic %, or the content of Nd exceeds 5.0 atomic %, the reflectance decreases to a low level. It should be noted that the remainder is substantially Ag, but can also include a small amount of an impurity element (e.g., oxygen, nitrogen, or carbon).

The first reflecting film 15 and the second reflecting film 25 are formed by a desired method such as sputtering using the target material having the composition of the alloy film described above.

In the etalon 1, the balance between the reflecting property and the transmitting property with respect to the light in the first reflecting film 15 and the second reflecting film 25 is important. Although the reflectance tends to be increased by increasing the thickness of the alloy film described above forming the first reflecting film 15 and the second reflecting film 25, the transmittance thereof is decreased. Therefore, there arises a problem of detection sensitivity as the etalon 1.

In contrast, the transmittance tends to be increased by decreasing the thickness of the alloy film described above forming the first reflecting film 15 and the second reflecting film 25, the reflectance thereof is decreased. Therefore, the spectral performance of the etalon 1 is degraded.

In particular, in the etalon for dispersing the light in a broad wavelength range, the transmittance of the light differs according to the wavelength, and it is important to achieve a balance between the reflectance and the transmittance of the reflecting film.

As a result of the consideration of such points as described above, the thickness of the alloy film described above forming the first reflecting film 15 and the second reflecting film 25 is determined to be equal to or larger than 10 nm and equal to or smaller than 40 nm.

If the thickness of the alloy film described above is smaller than 10 nm, since the thickness is too small, it is substantially difficult to stably form the alloy film.

In contrast, if the thickness of the alloy film described above exceeds 40 nm, the transmittance of the light decreases to a low level, and the intensity of the light transmitted through the etalon 1 is decreased to a low level, which might make it difficult to detect the light intensity.

Therefore, in the present embodiment, the thickness of the alloy film described above (the Ag—Sm—Cu alloy film or the Ag—Bi—Nd alloy film) is set to be equal to or larger than 10 nm and equal to or smaller than 40 nm.

Method of Manufacturing the Etalon

Next, a method of manufacturing the etalon 1 will be briefly explained.

The first substrate 10 and the second substrate 20 are each formed by performing etching on a quartz glass as a base material.

The Ag—Sm—Cu alloy film or the Ag—Bi—Nd ally film is formed by sputtering to each of the first substrate 10 and the second substrate 20 on which the etching has been performed. In the present embodiment, a single layer film is adopted.

In the patterning process for patterning the alloy films formed by the sputtering method, a wet etching method is used. In the wet etching method, the following processes, for example, are performed.

A. A resist film as an etching mask is formed on the alloy film with a desired pattern. When curing the resist, the alloy film is exposed to a high-temperature environment.

B. The resist film is stripped with an organic resist stripping solution. On this occasion, the alloy film is exposed to the organic solvent.

The first reflecting film 15 and the second reflecting film 25 are formed respectively on the first substrate 10 and the second substrate 20 through such a wet etching process.

Subsequently, the first substrate 10 and the second substrate 20 are bonded to each other to obtain the etalon 1. In the bonding process, for example, a plasma-polymerized film is deposited on the bonding surfaces as the bonding film 30, the surfaces thereof are activated by a plasma process or the like, and then the plasma-polymerized films are bonded to each other to thereby bond the first substrate 10 and the second substrate 20 to each other.

Since the first reflecting film 15 and the second reflecting film 25 are exposed to such circumstances, a high-temperature resistance property and an organic solvent resistance property are desired for the alloy film. In addition, a variety of resistance properties such as a high-temperature high-humidity resistance property, a sulfurization resistance property, and a halogen resistance property are desired for the alloy film. Hereinafter, the resistance properties desired for the alloy film in the manufacturing process of the etalon may sometimes be referred to collectively as a process resistance property, and in particular the resistance properties desired for the alloy film in the patterning process may sometimes be referred to as a patterning process resistance property.

Next, the present embodiment will be explained in further detail citing an example related to the high-temperature resistance property and the process resistance property of the alloy film described above. Here, a pure silver film, which is a metal film with a preferable reflectance of the light, will be considered as an object for comparison.

1. High-Temperature Resistance Property

Firstly, the high-temperature resistance properties of the pure silver film and the alloy films (the Ag—Sm—Cu alloy film and the Ag—Bi—Nd alloy film) are evaluated.

The pure silver film and the alloy films described above are formed by the sputtering method on a flat and smooth glass substrate using the target materials having the respective compositions.

The Ag—Sm—Cu alloy film includes Sm at 0.5 atomic % and Cu at 0.5 atomic %, and the remainder thereof is substantially Ag.

The Ag—Bi—Nd alloy film includes Bi at 1.0 atomic % and Nd at 0.5 atomic %, and the remainder thereof is substantially Ag.

The evaluation of the high-temperature resistance property is performed by comparing the reflectance of each of the pure silver film and the alloy films in the early period after the deposition with the reflectance of corresponding one of the films on which a heating process at 250° C. for 1 hour has been performed under an atmospheric environment (on which a high-temperature test has been performed). The reflectance in a range of the wavelength equal to or longer than 400 nm and equal to or shorter than 700 nm, which is the visible light range is measured using a spectrophotometer.

Table 1 shows the initial reflectance (unit: %) of each of the pure silver film and the alloy films described above and the reflectance (unit: %) thereof after the high-temperature test at the wavelengths of the light of 400 nm, 550 nm, and 700 nm.

TABLE 1

| | WAVELENGTH (nm) | | | | | |
|---|---|---|---|---|---|---|
| | INITIAL REFLECTANCE (%) | | | REFLECTANCE AFTER HIGH-TEMPERATURE TEST (%) | | |
| FILM CONFIGURATION | 400 | 550 | 700 | 400 | 550 | 700 |
| PURE SILVER | 74.1 | 90.1 | 95.0 | 48.2 | 78.5 | 86.6 |
| Ag—Sm—Cu | 71.4 | 90.4 | 94.6 | 70.3 | 89.7 | 94.4 |
| Ag—Bi—Nd | 71.1 | 90.4 | 94.8 | 70.5 | 89.9 | 94.7 |

As shown in Table 1, the initial reflectance of each of the Ag—Sm—Cu alloy film and the Ag—Bi—Nd alloy film has a roughly equivalent value compared to that of the pure silver film although some lower values are observed depending on the wavelength. However, it is found out that the reflectance drop of the alloy films after the high-temperature test is small compared to that of the pure silver film. It is found that in particular, the reflectance drop of the Ag—Bi—Nd alloy film is small in general throughout the wavelength range of visible light.

In contrast, although the pure silver film has high reflectance in general throughout the wavelength range of visible light in the early period after the deposition, the reflectance of the pure silver film having been exposed to the environment under high-temperature drops dramatically. It is conceivable that this is because the grain aggregate of the film grows due to the high temperature to thereby increase the surface roughness. Further, regarding in particular the short wavelength side (400 nm), the drop of the reflectance of the pure silver film is significant.

2. Process Resistance Property

Next, the process resistance properties of the pure silver film and the alloy films (the Ag—Sm—Cu alloy film and the Ag—Bi—Nd alloy film) are evaluated.

In a similar manner to the evaluation of the high-temperature resistance properties described above, the pure silver film and the alloy films described above are formed by the sputtering method on a flat and smooth glass substrate using the target materials having the respective compositions.

Further, as the process resistance property, the patterning process resistance property is evaluated here. The patterning process described below is adopted.

1. The pure silver film and the alloy films described above formed on the glass substrate are coated with a positive resist using a spin coater.

2. After applying the positive resist, pre-baking is performed at 90° C. for 15 minutes using a clean oven.

3. Exposure is performed through the photo mask using a contact aligner.

4. Development is performed using tetramethylammonium hydroxide aqueous solution as the developer.

5. Post-baking is performed at 120° C. for 20 minutes using the clean oven.

6. Etching is performed on the pure silver film and the alloy films described above with phosphoric-nitric-acetic acid aqueous solution using the resist as an etching mask.

7. The resist is stripped with an organic resist stripping solution.

a. Reflectance

Then, in a similar manner to the evaluation of the high-temperature resistance property, the evaluation is performed by comparing the reflectance of each of the pure silver film and the alloy films described above in the early period after the deposition with the reflectance of corresponding one of the films on which the patterning process has been performed.

Table 2 shows the initial reflectance (unit: %) of each of the pure silver film and the alloy films described above and the reflectance (unit: %) thereof after the patterning process at the wavelengths of the light of 400 nm, 550 nm, and 700 nm.

TABLE 2

| | WAVELENGTH (nm) | | | | | |
|---|---|---|---|---|---|---|
| | INITIAL REFLECTANCE (%) | | | REFLECTANCE AFTER PATTERNING PROCESS (%) | | |
| FILM CONFIGURATION | 400 | 550 | 700 | 400 | 550 | 700 |
| PURE SILVER | 74.1 | 90.1 | 95.0 | 46.8 | 75.9 | 84.1 |
| Ag—Sm—Cu | 71.4 | 90.4 | 94.6 | 69.9 | 90.2 | 94.6 |
| Ag—Bi—Nd | 71.1 | 90.4 | 94.8 | 68.3 | 89.9 | 94.7 |

As shown in Table 2, the initial reflectance of each of the Ag—Sm—Cu alloy film and the Ag—Bi—Nd alloy film has a roughly equivalent value compared to that of the pure silver film although some lower values are observed depending on the wavelength. However, it is found out that the reflectance drop of the alloy films after the patterning process is small. It is found that the reflectance drop of the Ag—Sm—Cu alloy film and the Ag—Bi—Nd alloy film is small in general throughout the wavelength range of visible light.

In contrast, in the early period after the deposition the pure silver film has the high reflectance in general throughout the wavelength range of visible light. However, the reflectance of the pure silver film having gone through the patterning process drops significantly. Regarding in particular the short wavelength side (400 nm), the reflectance drop of the pure silver film is significant. It is conceivable that such a drop of the reflectance of the pure silver film as described above is due to the exposure to the environment under high temperature in the baking process of the resist, and the exposure to the organic solvent in the resist stripping process.

b. Transmittance

Further, as the evaluation of the process resistance properties of the alloy films (the Ag—Sm—Cu alloy film and the Ag—Bi—Nd alloy film), the transmittance drop after the patterning process is also measured.

Specifically, the evaluation is performed by comparing the transmittance of the alloy films in the early period after the deposition and the transmittance of the alloy films after the patterning process with each other.

Table 3 shows the initial transmittance (unit: %) of each of the alloy films described above and the transmittance (unit: %) thereof after the patterning process at the wavelengths of the light of 400 nm, 550 nm, and 700 nm.

TABLE 3

| FILM CONFIGURATION | WAVELENGTH (nm) | | | | | |
|---|---|---|---|---|---|---|
| | INITIAL TRANSMITTANCE (%) | | | TRANSMITTANCE AFTER PATTERNING PROCESS (%) | | |
| | 400 | 550 | 700 | 400 | 550 | 700 |
| Ag—Sm—Cu | 20.1 | 6.9 | 3.6 | 21.5 | 7.1 | 3.6 |
| Ag—Bi—Nd | 19.7 | 7.6 | 4.0 | 22.3 | 8.0 | 4.1 |

As shown in Table 3, although the low values are observed in the initial transmittance depending on the wavelength in the early period after the deposition in the Ag—Sm—Cu alloy film and the Ag—Bi—Nd alloy film, it is found out that the increase in the transmittance of each of the alloy films after the patterning process is small.

As described above, it is found out that in the Ag—Sm—Cu alloy film and the Ag—Bi—Nd alloy film, the reflectance variation after the high-temperature test is small, and the reflectance variation and the transmittance variation after the patterning process are also small. Therefore, it is found out that the etalon using these alloy films as the pair of reflecting films can be prevented from being degraded in performance. Further, it is found out that the degradation of the performance due to the temporal change after shipping the variable wavelength interference filter as a product is also prevented, and thus an etalon with high reliability can be obtained.

Film Thickness of Alloy Film and Intensity of Transmitted Light

Next, the film thickness of each of the alloy films and the intensity of the light transmitted through the alloy film will be considered.

Table 4 shows the light intensity ratio, the current of a photodiode (PD), and the S/N ratio with respect to each of film thicknesses of the alloy films.

Regarding the light intensity ratio, the light intensity values at the values (10 nm, 20 nm, 30 nm, 40 nm, and 50 nm) of the film thickness of each of the alloy films are compared as the light intensity ratios taking the light intensity value at the film thickness value of the alloy film of 50 nm as 1.0 (the reference).

Further, a photodiode is used as an optical receiver for receiving the light intensity, and the detection current thereof is shown as the PD current.

Further, assuming that the intensity of the light source drops due to the temporal change, and the measurement noise in the spectral detection is generated as large as 1 pA, the S/N ratio representing the influence rate of the measurement noise at that occasion is also shown together therewith.

It should be noted that the data shows the values in the case in which the transmission wavelength of the light is 400 nm as an example. Further, the film thickness of 10 nm is the limit film thickness for stable film deposition.

TABLE 4

| FILM CONFIGURATION | | FILM THICKNESS (nm) | | | | |
|---|---|---|---|---|---|---|
| | | 10 | 20 | 30 | 40 | 50 |
| Ag—Sm—Cu | INTENSITY RATIO | 18.4 | 8.5 | 4.1 | 2.3 | 1.0 |
| | PD CURRENT (pA) | 315.9 | 145.1 | 70.3 | 38.7 | 17.1 |
| | S/N RATIO | 1% | 1% | 3% | 5% | 12% |
| Ag—Bi—Nd | INTENSITY RATIO | 17.3 | 8.5 | 4.4 | 2.2 | 1.0 |
| | PD CURRENT (pA) | 289.1 | 142.0 | 72.7 | 37.1 | 16.7 |
| | S/N RATIO | 1% | 1% | 3% | 5% | 12% |

As shown in Table 4, in the Ag—Sm—Cu alloy film, the light intensity ratio increases as the film thickness decreases, and takes the value of 2.3 at the film thickness of 40 nm, the value of 4.1 at the film thickness of 30 nm, the value of 8.5 at the film thickness of 20 nm, and the value of 18.4 at the film thickness of 10 nm. Further, the PD current also increases as the light intensity increases.

Further, the S/N ratio at each of the thickness values of the Ag—Sm—Cu alloy film decreases as the film thickness decreases, and takes the value of 12% at the film thickness of 50 nm, the value of 5% at the film thickness of 40 nm, the value of 3% at the film thickness of 30 nm, the value of 1% at the film thickness of 20 nm, and the value of 1% at the film thickness of 10 nm.

Further, in the Ag—Bi—Nd alloy film, similarly, the light intensity ratio increases as the film thickness decreases, and takes the value of 2.2 at the film thickness of 40 nm, the value of 4.4 at the film thickness of 30 nm, the value of 8.5 at the film thickness of 20 nm, and the value of 17.3 at the film thickness of 10 nm. Further, the PD current also increases as the light intensity increases.

Further, the S/N ratio at each of the thickness values of the Ag—Bi—Nd alloy film decreases as the film thickness decreases, and takes the value of 12% at the film thickness of 50 nm, the value of 5% at the film thickness of 40 nm, the value of 3% at the film thickness of 30 nm, the value of 1% at the film thickness of 20 nm, and the value of 1% at the film thickness of 10 nm.

In view of the result described above, if the film thickness is equal to or larger than 10 nm and equal to or smaller than 40 nm, the Ag—Sm—Cu alloy film and the Ag—Bi—Nd alloy film can be used as the reflecting film fulfilling the S/N ratio of equal to or lower than 6%.

Further, in order to enhance the spectral accuracy in both of the alloy films, it is preferable for the film thickness to be equal to or larger than 20 nm and equal to or smaller than 30 nm. If the film thickness is in this range, the alloy films can be used as the reflecting film with the S/N ratio of equal to or lower than 3%.

Next, the relationship between the transmissive wavelength and the transmittance at the thickness values of each of the alloy films will be described.

Figure 3:
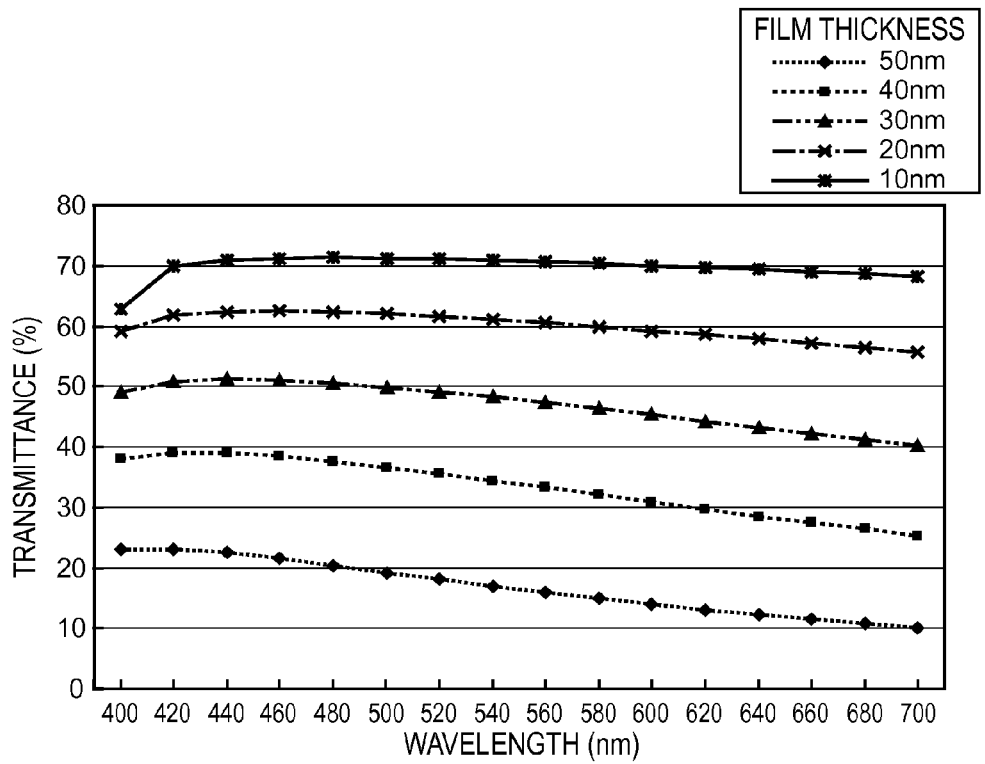
FIG. 3 is a graph showing a relationship between the transmissive wavelength and the transmittance at some thickness values of an Ag—Sm—Cu alloy film.
Figure 4:
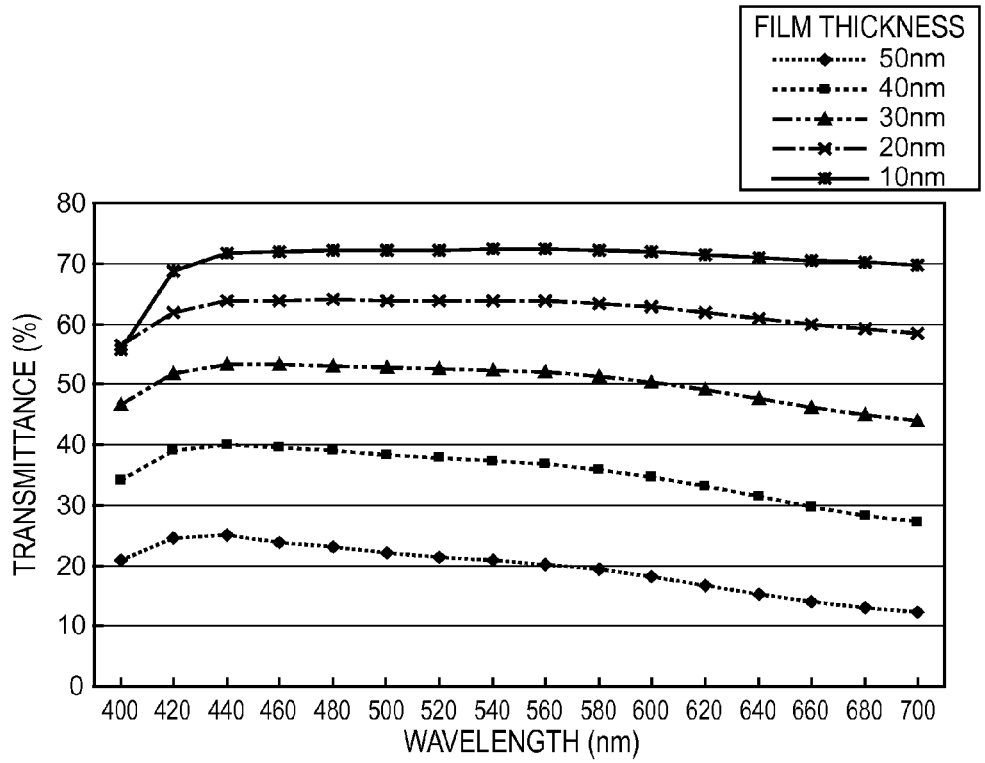
FIG. 4 is a graph showing a relationship between the transparent wavelength and the transmittance at some thickness values of an Ag—Bi—Nd alloy film.

FIG. 3 is a graph showing the relationship between the transmissive wavelength and the transmittance at some thickness values of the Ag—Sm—Cu alloy film. FIG. 4 is a graph showing the relationship between the transmissive wavelength and the transmittance at some thickness values of the Ag—Bi—Nd alloy film.

As described above, it is understood that the Ag—Sm—Cu alloy film and the Ag—Bi—Nd alloy film with the film thickness of 10 nm, 20 nm, 30 nm, or 40 nm have a preferable transmittance in the wavelength range of equal to or longer than 400 nm and equal to or shorter than 700 nm in the visible light range, and can effectively be used as the reflecting film of the etalon.

As described hereinabove, the etalon 1 as the interference filter according to the present embodiment has the reflecting films opposed to each other across the gap including the Ag—Sm—Cu alloy film or the Ag—Bi—Nd film.

Further, since the Ag—Sm—Cu alloy film or the Ag—Bi—Nd film has the composition described above, the degradation of the characteristics due to the fabrication process or the temporal change is reduced to a low level, and the deterioration of the performance of the etalon can more surely be suppressed.

Further, since the thickness of the Ag—Sm—Cu alloy film or the Ag—Bi—Nd alloy film is equal to or larger than 10 nm and equal to or smaller than 40 nm, the reflecting film has the transmitting property in addition to the reflecting property of the light, and can obtain the particularly preferable transmitting property, and can thus assure the preferable spectral accuracy of the etalon satisfying the desired performance.

Further, the reflecting films are each a single layer film formed of the Ag—Sm—Cu alloy film or the Ag—Bi—Nd alloy film, and therefore exhibits a high reflectance in a broad wavelength band in the wavelength range of visible light.

Modified Example

Next, a modified example of the etalon as the interference filter according to the first embodiment will be explained.

The present modified example is different only in the configuration of the reflecting films from the first embodiment. Therefore, constituents substantially the same as those of the first embodiment will be denoted with the same reference symbols, and an explanation thereof will be omitted.

Figure 5:
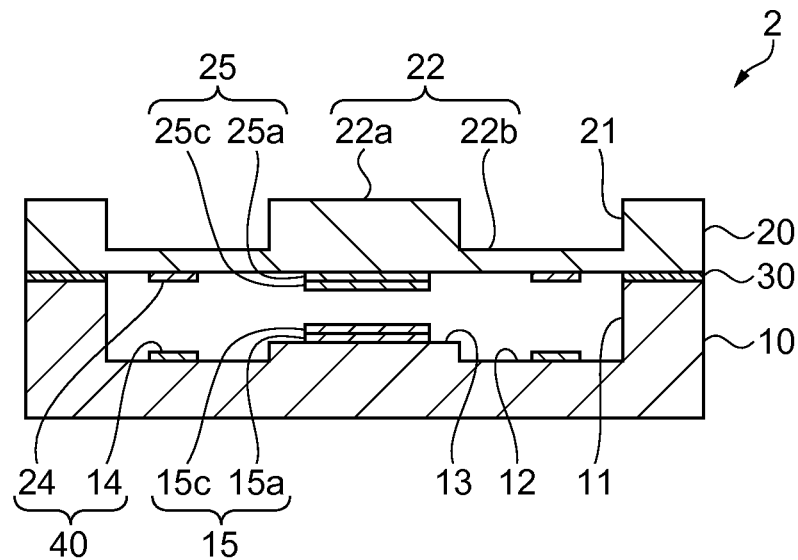
FIG. 5 is a cross-sectional view showing a schematic configuration of a modified example of the first embodiment.

FIG. 5 is a cross-sectional view showing a schematic configuration of an etalon according to the modified example.

In the modified example, the etalon 2 is different from the etalon 1 of the first embodiment in the point that the first reflecting film 15 and the second reflecting film 25 of the etalon 2 include protective films 15*c*, 25*c* in addition to the alloy films 15*a*, 25*a*, respectively. Similarly to the first embodiment, the alloy films 15*a*, 25*a* are each formed of the Ag—Sm—Cu alloy film or the Ag—Bi—Nd alloy film.

As shown in FIG. 5, in the first substrate 10, the alloy film 15*a* and the protective film. 15*c* are disposed in this order from the first substrate 10. Similarly, in the second substrate 20, the alloy film 25*a* and the protective film 25*c* are disposed in this order from the second substrate 20.

As the protective films 15*c*, 25*c*, silicon oxide ($SiO_2$), silicon oxynitride (SiON), silicon nitride (SiN), alumina, and so on can be used. Further, the thickness of each of the protective films is preferably equal to or larger than 10 nm and equal to or smaller than 20 nm. By setting the thickness in such a range, it is possible to protect the first reflecting film 15 and the second reflecting film 25 without degrading the reflectance and the transmittance.

As described above, according to the etalon 2 of the present modified example, since the alloy films 15*a*, 25*a* are protected by the protective films 15*c*, 25*c*, the reflectance drop of the alloy films 15*a*, 25*a* of the first reflecting film 15 and the second reflecting film 25 due to the fabrication process and the temporal change is suppressed, and thus the performance deterioration of the etalon 2 can further be prevented.

Second Embodiment

Next, an etalon according to a second embodiment will be explained.

The present embodiment is different only in the configuration of the reflecting films from the first embodiment. Therefore, constituents substantially the same as those of the first embodiment will be denoted with the same reference symbols, and an explanation thereof will be omitted.

Figure 6:
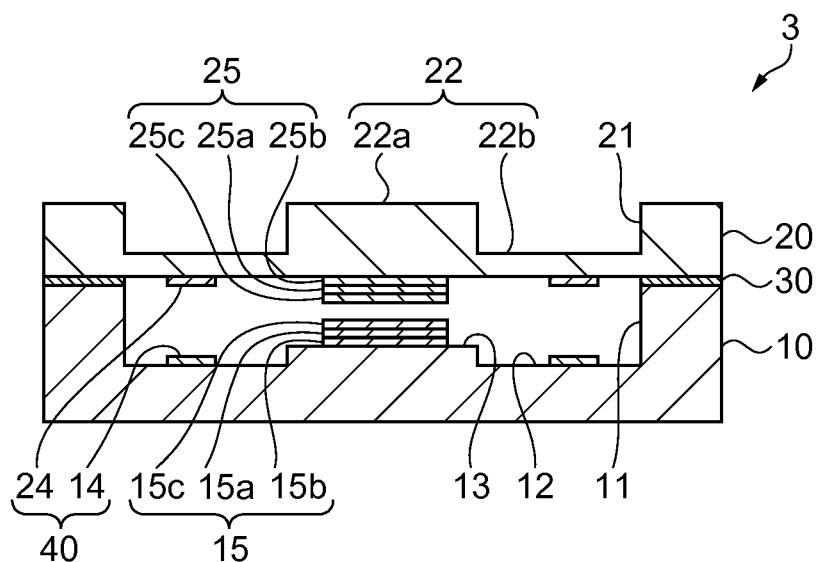
FIG. 6 is a cross-sectional view showing a schematic configuration of an etalon as an interference filter according to a second embodiment of the invention.

FIG. 6 is a cross-sectional view showing a schematic configuration of an etalon according to the second embodiment.

The second embodiment is different from the first embodiment in the point that the first reflecting film 15 and the second reflecting film 25 of the etalon 3 include dielectric films 15*b*, 25*b* and the protective films 15*c*, 25*c* in addition to the alloy films 15*a*, 25*a*, respectively.

Similarly to the first embodiment, the alloy films 15*a*, 25*a* are each formed of the Ag—Sm—Cu alloy film or the Ag—Bi—Nd alloy film.

As shown in FIG. 6, in the first substrate 10, the dielectric film 15*b*, the alloy film 15*a*, and the protective film 15*c* are disposed in this order from the first substrate 10. The dielectric film 15*b* is disposed between the first substrate 10 and the alloy film 15*a*.

Similarly, in the second substrate 20, the dielectric film 25*b*, the alloy film 25*a*, and the protective film 25*c* are disposed in this order from the second substrate 20. The dielectric film 25*b* is disposed between the second substrate 20 and the alloy film 25*a*.

As the dielectric films 15*b*, 25*b*, a single layer film made of titanium oxide ($TiO_2$) or a dielectric multilayer film may be used. The dielectric multilayer film is a multilayer film obtained by stacking a layer of titanium oxide ($TiO_2$) or tantalum pentoxide ($Ta_2O_5$) and a layer of silicon oxide ($SiO_2$) or magnesium fluoride ($MgF_2$) on each other. As described above, in the case of the dielectric multilayer film, the layer of a high-refractive index material ($TiO_2$, $Ta_2O_5$) and the layer of a low-refractive index material ($SiO_2$, $MgF_2$) are stacked on each other. The thickness of the single layer film, or the thickness of each of the layers and the number of the layers of the multilayer film are appropriately set based on the desired optical characteristics.

The protective films 15*c*, 25*c* include silicon oxide ($SiO_2$), silicon oxynitride (SiON), silicon nitride (SiN), or alumina. The thickness of each of the protective films is preferably equal to or larger than 10 nm and equal to or smaller than 20 nm. By setting the thickness in such a range, it is possible to protect the first reflecting film 15 and the second reflecting film 25 without degrading the reflectance and the transmittance.

It should be noted that although the protective films 15*c*, 25*c* for covering the alloy films 15*a*, 25*a* are provided in the present embodiment, it is also possible to omit the protective films 15*c*, 25*c*.

As described hereinabove, according to the etalon 3 of the present embodiment, since the first reflecting film 15 and the second reflecting film 25 are respectively composed of the dielectric films 15*b*, 25*b* and the alloy films 15*a*, 25*a* stacked on each other, the reflectance on the short wavelength side of the visible light range is improved compared to the case of being formed only of the alloy films 15*a*, 25*a*. As a result, the wavelength band in which the high reflectance is exhibited can be further extended, and thus, it is possible to obtain the etalon 3 provided with the first reflecting film 15 and the second reflecting film. 25 having a high reflectance throughout the visible light range.

Further, since the adhesiveness between the dielectric films 15b, 25b and the alloy films 15a, 25a and the adhesiveness between the dielectric films 15b, 25b and the glass substrate are both preferably high, the performance deterioration of the etalon 3 due to the shortage in the adhesive force can be suppressed.

Further, since the alloy films 15a, 25a are protected by the protective films 15c, 25c, the reflectance drop of the alloy films 15a, 25a of the first reflecting film 15 and the second reflecting film 25 due to the fabrication process and the temporal change is suppressed, and thus the performance deterioration of the etalon 3 can further be prevented.

Third Embodiment

Next, an optical module and an electronic apparatus using the etalon explained in the first and second embodiment sections described above will be explained. In the third embodiment, a colorimetric device for measuring the chromaticity of a measurement object will be explained as an example.

Figure 7:
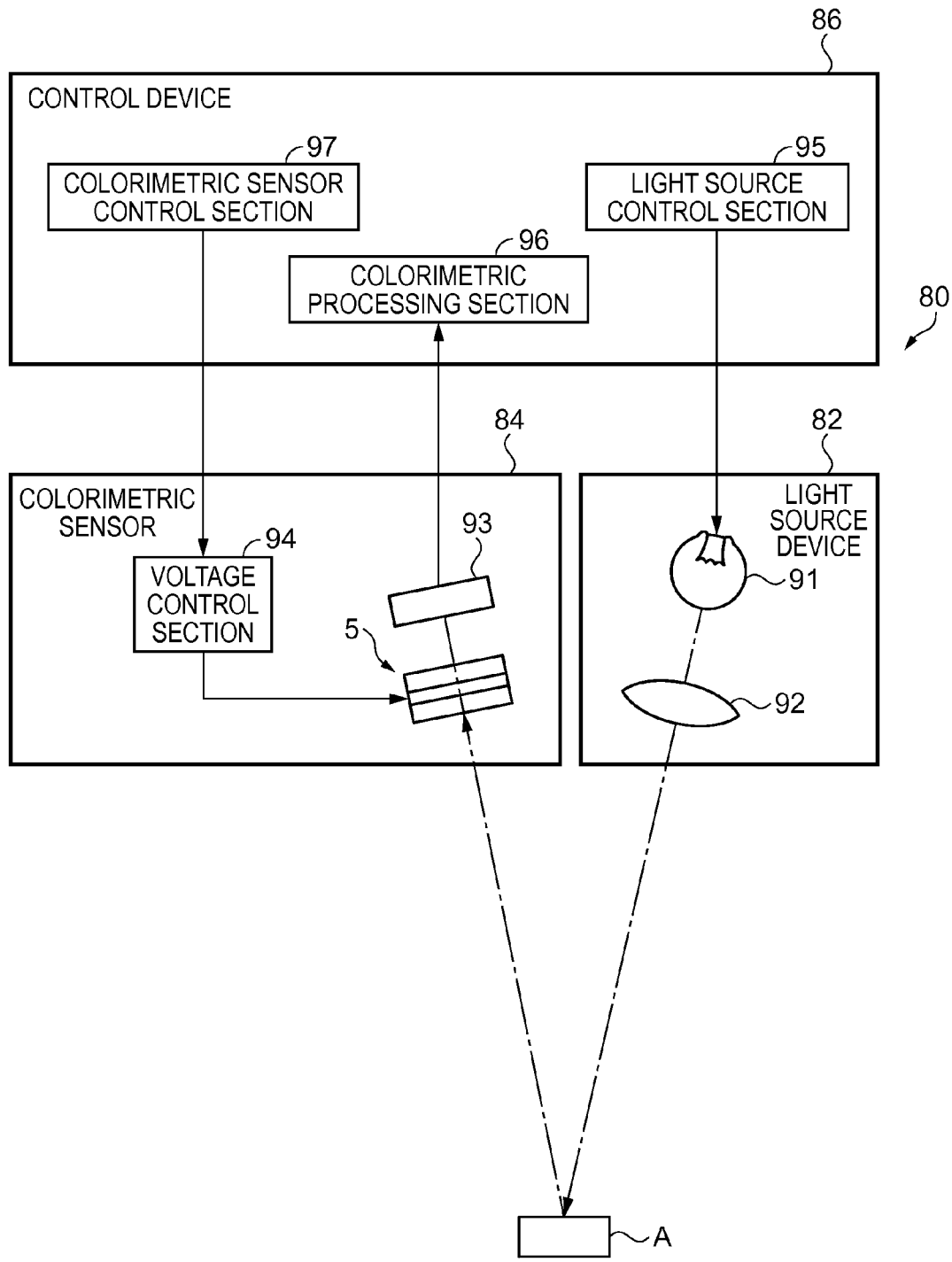
FIG. 7 is a block diagram showing a configuration of a colorimetric device as an electronic apparatus according to a third embodiment of the invention.

FIG. 7 is a block diagram showing a configuration of the colorimetric device.

The colorimetric device 80 is provided with a light source device 82 for irradiating a test object A with the light, a colorimetric sensor 84 (an optical module), and a control device 86 for controlling an overall operation of the colorimetric device 80.

The colorimetric device 80 is a device for irradiating the test object A with the light by the light source device 82, receiving the test target light reflected by the test object A using the colorimetric sensor 84, and analyzing and then measuring the chromaticity of the test target light based on the detection signal output from the colorimetric sensor 84.

The light source device 82 is provided with a light source 91 and a plurality of lenses 92 (one of the lenses is shown alone in FIG. 7), and emits a white light to the test object A. Further, it is possible for the plurality of lenses 92 to include a collimator lens, and in this case, the light source device 82 converts the light emitted from the light source 91 into parallel light with the collimator lens, and emits it from the projection lens not shown toward the test object A.

It should be noted that although in the present embodiment the colorimetric device 80 provided with the light source device 82 is described as an example, in the case in which, for example, the test object A is a light emitting member, it is also possible to configure the colorimetric device without providing the light source device 82.

The colorimetric sensor 84 as the optical module is provided with an etalon (a variable wavelength interference filter) 5, a voltage control section 94 for controlling the voltage applied to the electrostatic actuator 40 to thereby vary the wavelength of the light to be transmitted by the etalon 5, and a light receiving section 93 (a detection section) for receiving the light transmitted through the etalon 5.

Further, the colorimetric sensor 84 is provided with an optical lens (not shown) for guiding the reflected light (the test target light) reflected by the test object A to the etalon 5. Further, the colorimetric sensor 84 disperses the test target light having entered the optical lens into the light in a predetermined wavelength band with the etalon 5, and the light thus dispersed is received by the light receiving section 93.

The light receiving section 93 is formed of a photoelectric conversion element such as a photodiode as the detection section, and generates an electric signal corresponding to the received light intensity. Further, the light receiving element 93 is connected to the control device 86, and outputs the electric signal thus generated to the control device 86 as a light reception signal.

The voltage control section 94 controls the voltages to be applied to the electrostatic actuator 40 based on the control signal input from the control device 86.

The control device 86 controls an overall operation of the colorimetric device 80. As the control device 86, a general-purpose personal computer, a handheld terminal, a colorimetry-dedicated computer, and so on can be used.

Further, the control device 86 is configured including a light source control section 95, a colorimetric sensor control section 97, a colorimetric processing section 96 (an analysis processing section), and so on.

The light source control section 95 is connected to the light source device 82. Further, the light source control section 95 outputs a predetermined control signal to the light source device 82 based on, for example, a setting input by the user to thereby make the light source device 82 emit a white light with a predetermined brightness.

The colorimetric sensor control section 97 is connected to the colorimetric sensor 84. Further, the colorimetric sensor control section 97 sets the wavelength of the light to be received by the colorimetric sensor 84 based on, for example, the setting input by the user, and then outputs the control signal, which instructs the detection of the intensity of the light with the wavelength thus set, to the colorimetric sensor 84. Thus, the voltage control section 94 of the colorimetric sensor 84 sets the voltage to be applied to the electrostatic actuator 40 based on the control signal so as to transmit the light having the wavelength desired by the user.

The colorimetric processing section 96 controls the colorimetric sensor control section 97 to vary the gap size between the reflecting films of the etalon 5 to thereby vary the wavelength of the light to be transmitted through the etalon 5. Further, the colorimetric processing section 96 obtains the light intensity of the light transmitted through the etalon 5 based on a light reception signal input from the light receiving section 93. Then, the colorimetric processing section 96 calculates the chromaticity of the light reflected by the test object A based on the intensity values of the light components having the respective wavelengths obtained as described above.

As described above, since the colorimetric device 80 as the electronic apparatus according to the present embodiment and the colorimetric sensor 84 as the optical module have the gap size between the reflecting films, which can be accurately set, and have the etalon 5 superior in spectral accuracy, a colorimetric sensor with good accuracy can be obtained.

As described hereinabove, although the colorimetric device 80 is exemplified in the third embodiment as the electronic apparatus, the variable wavelength interference filter, the optical module, and the electronic apparatus can be used in a variety of fields besides the above.

For example, they can be used as an optical base system for detecting the presence of a specific substance. As such a system, there can be cited, for example, an in-car gas leak detector adopting a spectroscopic measurement method using the etalon and detecting a specific gas with high sensitivity, and a gas detection device such as an optoacoustic noble-gas detector for breath-testing.

Fourth Embodiment

An example of the gas detection device will hereinafter be explained with reference to the accompanying drawings.

Figure 8:
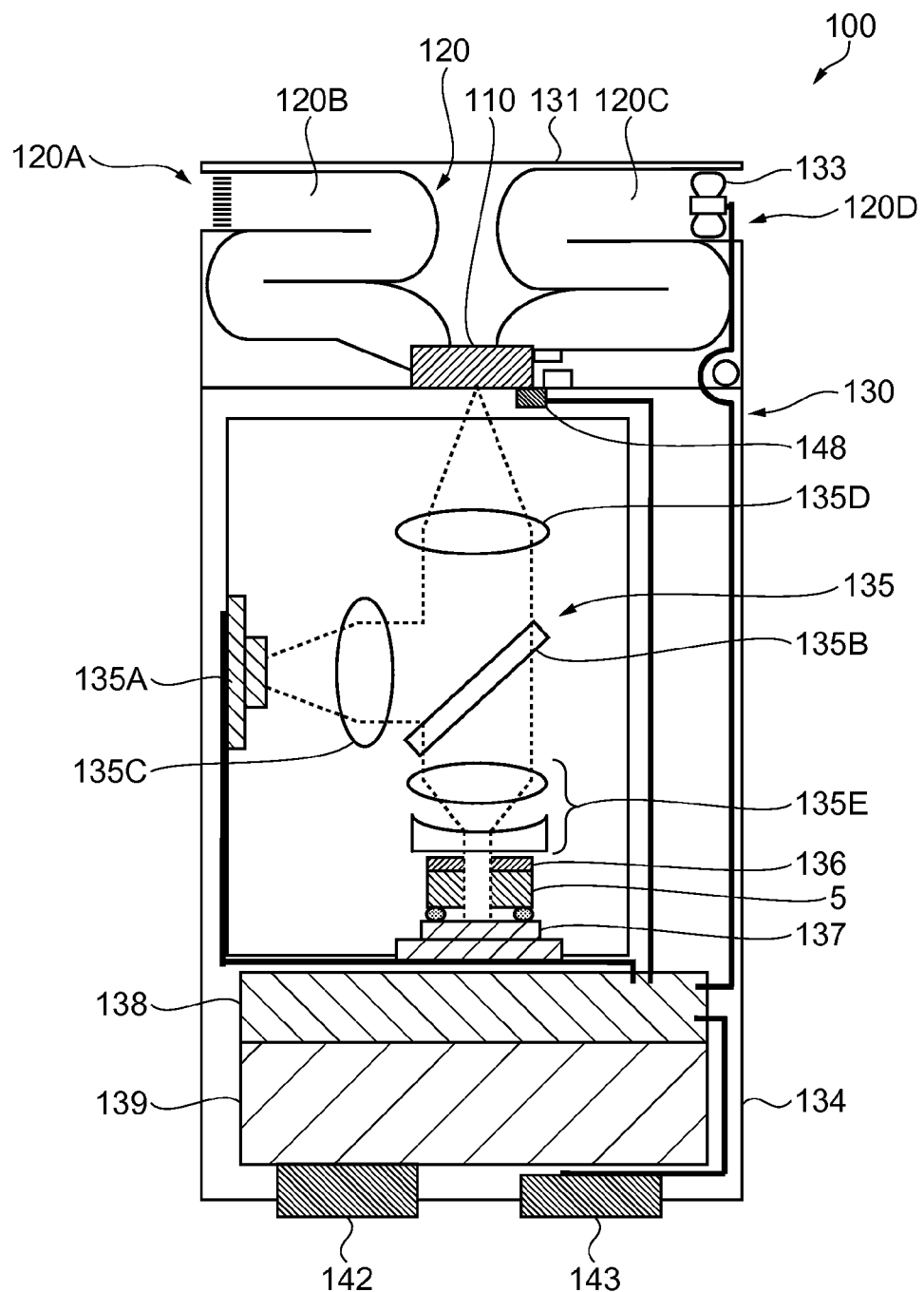
FIG. 8 is a cross-sectional view showing a configuration of a gas detection device as an electronic apparatus according to a fourth embodiment of the invention.

FIG. 8 is a cross-sectional view showing an example of the gas detection device provided with the etalon.

Figure 9:
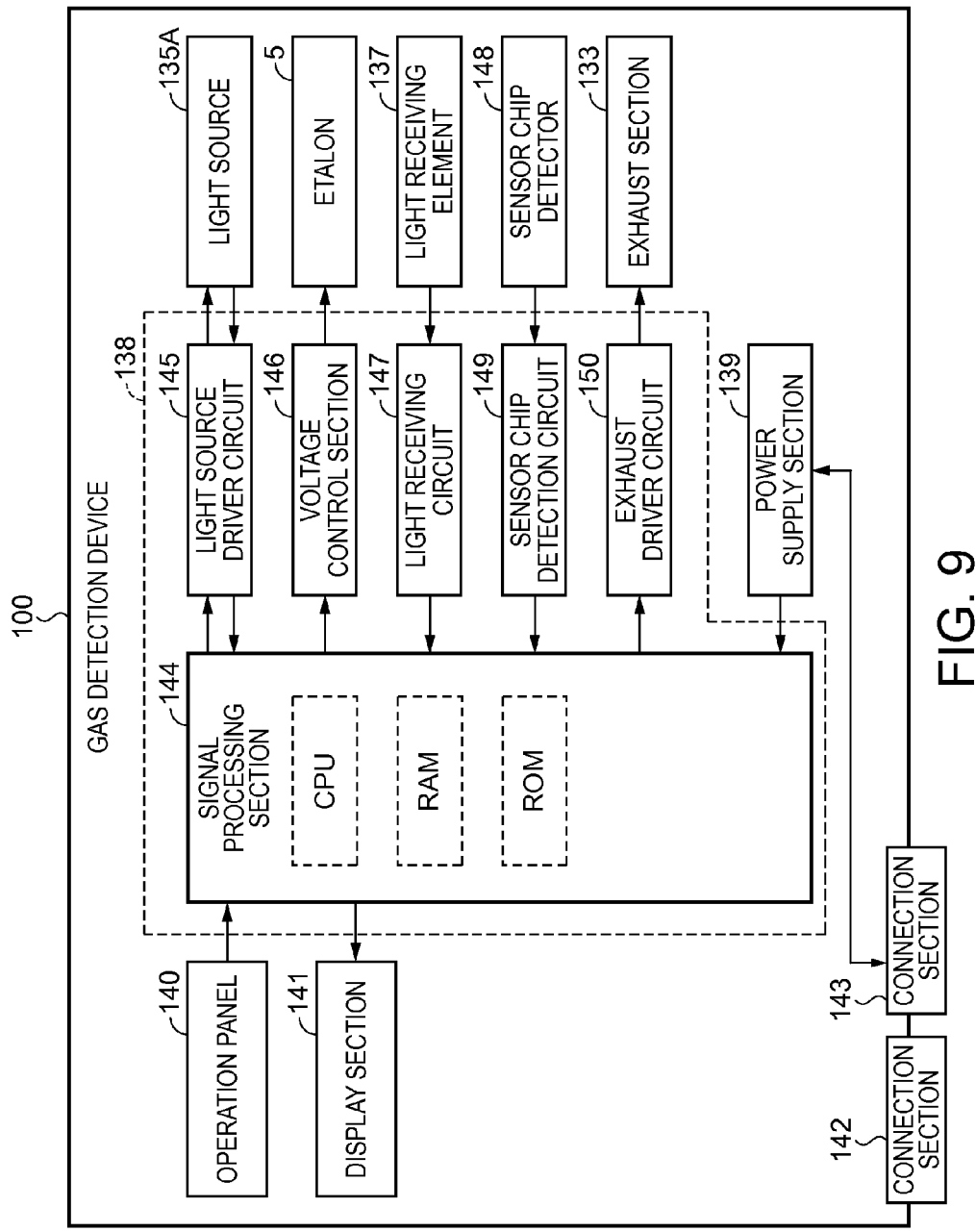
FIG. 9 is a circuit block diagram of the gas detection device according to the fourth embodiment.

FIG. 9 is a block diagram showing a configuration of a control system of the gas detection device.

As shown in FIG. 8, the gas detection device 100 is configured including a sensor chip 110, a channel 120 provided with a suction port 120A, a suction channel 120B, an exhaust channel 120C, and an exhaust port 120D, and a main body section 130.

The main body 130 is composed of a detection section (an optical module) including a sensor section cover 131 having an opening to which the channel 120 is detachably attached, an exhaust section 133, a housing 134, an optical section 135, a filter 136, the etalon (the variable wavelength interference filter) 5, a light receiving element 137 (a light receiving section), and so on, a control section 138 for processing the signal thus detected and controlling the detection section, a power supply section 139 for supplying electrical power, and so on. Further, the optical section 135 is composed of a light source 135A for emitting light, a beam splitter 135B for reflecting the light, which is input from the light source 135A, toward the sensor chip 110, and transmitting the light, which is input from the sensor chip side, toward the light receiving element 137, and lenses 135C, 135D, and 135E.

Further, as shown in FIG. 9, the gas detection device 100 is provided with an operation panel 140, a display section 141, a connection section 142 for an interface with the outside, and the power supply section 139. In the case in which the power supply section 139 is a secondary cell, a connection section 143 for the battery charge can also be provided.

Further, the control section 138 of the gas detection device 100 is provided with a signal processing section 144 formed of a CPU and so on, a light source driver circuit 145 for controlling the light source 135A, a voltage control section 146 for controlling the etalon 5, a light receiving circuit 147 for receiving the signal from the light receiving element 137, a sensor chip detection circuit 149 for receiving the signal from a sensor chip detector 148 for reading a code of a sensor chip 110 and detecting the presence or absence of the sensor chip 110, an exhaust driver circuit 150 for controlling the exhaust section 133, and so on.

Next, an operation of the gas detection device 100 will hereinafter be explained.

The sensor chip detector 148 is disposed in the sensor section cover 131 in the upper part of the main body section 130, and the sensor chip detector 148 detects the presence or absence of the sensor chip 110. When detecting the detection signal from the sensor chip detector 148, the signal processing section 144 determines that it is the condition in which the sensor chip 110 is attached, and outputs a display signal for displaying the fact that the detection operation can be performed to the display section 141.

Then, if, for example, the user operates the operation panel 140, and the operation panel 140 outputs an instruction signal indicating that the detection process will be started to the signal processing section 144, the signal processing section 144 firstly outputs the signal for operating the light source to the light source driver circuit 145 to thereby operate the light source 135A. When the light source 135A is driven, the light source 135A emits a stable laser beam, which has a single wavelength and is a linearly polarized light. Further, the light source 135A incorporates a temperature sensor and a light intensity sensor, and the information thereof is output to the signal processing section 144. Then, if the signal processing section 144 determines that the light source 135A is operating stably based on the temperature and the light intensity input from the light source 135A, the signal processing section 144 controls the exhaust driver circuit 150 to operate the exhaust section 133. Thus, the gaseous sample including the target material (the gas molecule) to be detected is guided from the suction port 120A to the suction channel 120B, the inside of the sensor chip 110, the exhaust channel 120C, and the exhaust port 120D.

Further, the sensor chip 110 is a sensor incorporating a plurality of sets of metal nano-structures, and using localized surface plasmon resonance. In such a sensor chip 110, an enhanced electric field is formed between the metal nano-structures due to the laser beam, and when the gas molecules enter the enhanced electric field, the Raman scattered light including the information of the molecular vibration and the Rayleigh scattered light are generated.

The Rayleigh scattered light and the Raman scattered light pass through the optical section 135 and then enter the filter 136, and the Rayleigh scattered light is separated by the filter 136, and the Raman scattered light enters the etalon 5. Then, the signal processing section 144 controls the voltage control section 146 to control the voltage to be applied to the etalon 5 to thereby make the etalon 5 disperse the Raman scattered light corresponding to the gas molecules to be the detection object. Thereafter, if the light thus dispersed is received by the light receiving element 137, the light reception signal corresponding to the received light intensity is output to the signal processing section 144 via the light receiving circuit 147.

The signal processing section 144 compares the spectrum data of the Raman scattered light corresponding to the gas molecule to be the detection object obtained in such a manner as described above and the data stored in the ROM with each other to thereby determine whether or not it is the target gas molecule, and thus the substance is identified. Further, the signal processing section 144 makes the display section 141 display the result information, or outputs it from the connection section 142 to the outside.

It should be noted that although in FIGS. 8 and 9 the gas detection device 100 for dispersing the Raman scattered light with the etalon 5, and performing the gas detection based on the Raman scattered light thus dispersed is cited as an example, it is also possible to use it as a gas detection device for identifying the gas type by detecting the absorbance unique to the gas. In this case, the gas is made to flow into the sensor, and the gas sensor for detecting the light absorbed by the gas in the incident light is used as the optical module according to the embodiment of the invention. Further, the gas detection device 100 for analyzing and determining the gas flowing into the sensor using such a gas sensor is cited as the electronic apparatus according to the embodiment of the invention. It is possible to detect the component of the gas using the etalon according to the embodiment of the invention also with such a configuration.

Further, as the system for detecting the presence of the specific substance, besides the gas detection described above, there can be cited a substance component analysis device such as a non-invasive measurement device of a sugar group using near-infrared dispersion, or a non-invasive measurement device of the information of food, biological object, or mineral.

Fifth Embodiment

Next, as an example of the substance component analysis device described above, a food analysis device will be explained.

Figure 10:
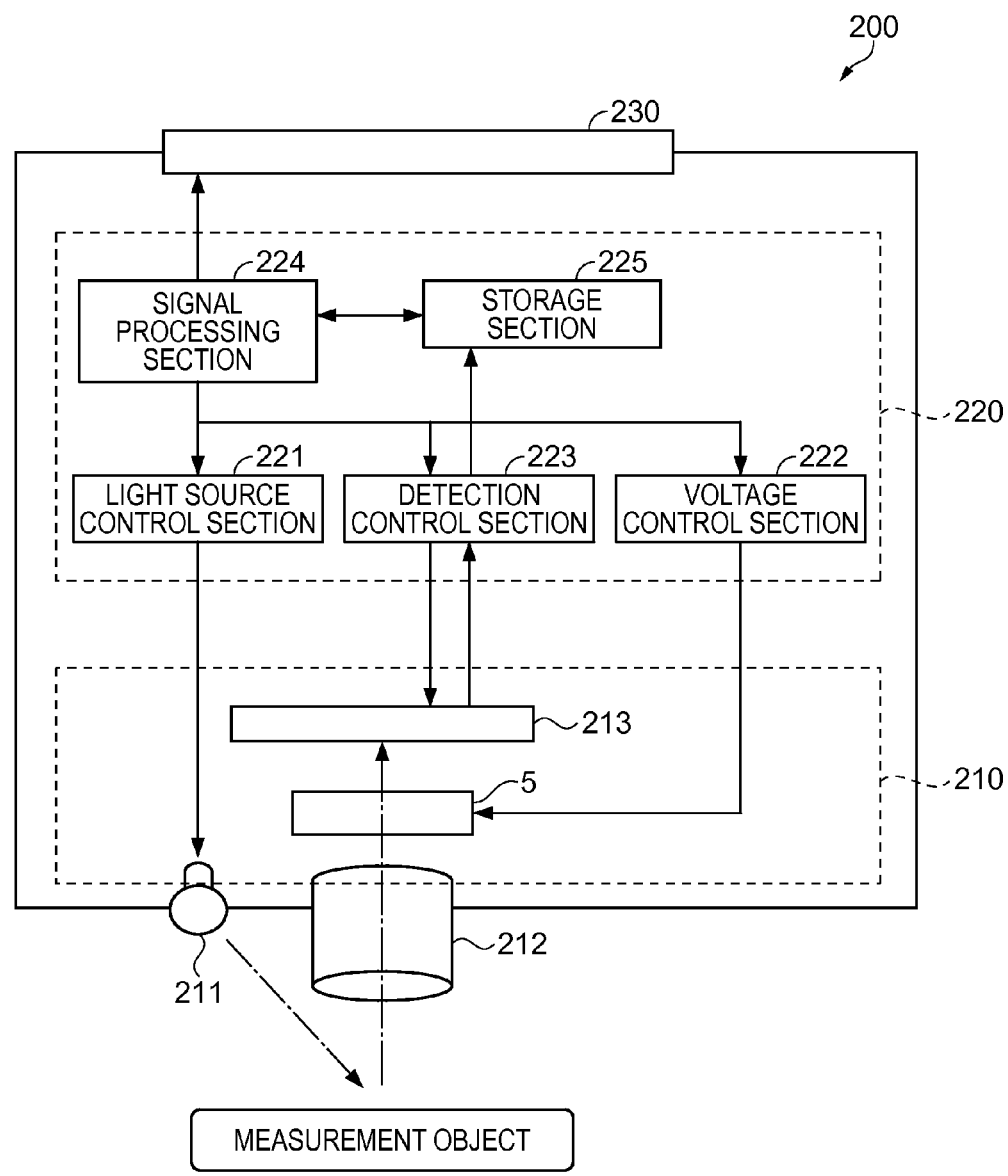
FIG. 10 is a block diagram showing a configuration of a food analyzing device as an electronic apparatus according to a fifth embodiment of the invention.

FIG. 10 is a block diagram showing a configuration of the food analysis device as an example of the electronic apparatus using the etalon 5.

The food analysis device 200 is provided with a detector (the optical module) 210, a control section 220, and a display section 230. The detector 210 is provided with a light source 211 for emitting light, an imaging lens 212 to which the light from a measurement object is introduced, the etalon 5 for dispersing the light thus introduced from the imaging lens 212, and an imaging section (light receiving section) 213 for detecting the light thus dispersed.

Further, the control section 220 is provided with a light source control section 221 for performing lighting/extinction control of the light source 211 and brightness control when lighting, a voltage control section 222 for controlling the etalon 5, a detection control section 223 for controlling the imaging section 213 and obtaining a spectral image imaged by the imaging section 213, a signal processing section 224, and a storage section 225.

In the food analysis device 200, when the device is started up, the light source control section 221 controls the light source 211, and the light source 211 irradiates the measurement object with the light. Then, the light reflected by the measurement object passes through the imaging lens 212 and then enters the etalon 5. The voltage with which the etalon 5 can disperse the light into desired wavelengths is applied to the etalon 5 under the control of the voltage control section 222, and the light thus dispersed is imaged by the imaging section 213 formed of, for example, a CCD camera. Further, the light thus imaged is stored in the storage section 225 as the spectral image. Further, the signal processing section 224 controls the voltage control section 222 to vary the voltage value to be applied to the etalon 5 to thereby obtain the spectral image corresponding to each wavelength.

Then, the signal processing section 224 performs an arithmetic process on the data of each pixel in each of the images stored in the storage section 225 to thereby obtain the spectrum in each pixel. Further, the storage section 225 stores, for example, information related to a component of food corresponding to the spectrum, and the signal processing section 224 analyzes the data of the spectrum thus obtained based on the information related to the food stored in the storage section 225, and then obtains the food component included in the detection object and the content thereof. Further, the calorie of the food, the freshness thereof, and so on can also be calculated based on the food component and the content thus obtained. Further, by analyzing the spectral distribution in the image, it is possible to perform extraction of the portion with low freshness in the food as a test object, and further, it is also possible to perform detection of a foreign matter included in the food.

Then, the signal processing section 224 performs a process of making the display section 230 display the information of the components, the contents, the calorie, the freshness, and so on of the food as the test object thus obtained.

Further, FIG. 10 shows an example of the food analysis device 200. It is also possible to use substantially the same configuration as the non-invasive measurement device of other information as described above. For example, it can be used as a biological analysis device for analyzing a biological component such as measurement and analysis of a biological fluid such as blood. If a device of detecting ethyl alcohol is provided as a device of measuring the biological fluid component such as blood as an example of such a biological analysis device, the device can be used as a drunken driving prevention device for detecting the influence of alcohol to the driver of a vehicle. Further, it can also be used as an electronic endoscopic system equipped with such a biological analysis device.

Further, it can also be used as a mineral analysis device for performing component analysis of minerals.

Further, the variable wavelength interference filter, the optical module, and the electronic apparatus according to the embodiment of the invention can be applied to the following devices.

For example, it is also possible to transmit data with the light having each of the wavelengths by temporally varying the intensity of the light having each of the wavelengths, and in this case, it is possible to extract the data transmitted with the light having a specific wavelength by dispersing the light having the specific wavelength using the etalon provided to the optical module, and then making the light receiving section receive the light. Therefore, by processing the data of the light having each of the wavelengths using the electronic apparatus equipped with such a data extracting optical module, it is also possible to perform optical communication.

Sixth Embodiment

Further, as another electronic apparatus, the invention can also be applied to a spectroscopic camera for imaging the spectral image and a spectroscopic analyzer by dispersing the light with the etalon (the variable wavelength interference filter) according to the embodiment of the invention. As an example of such a spectroscopic camera, an infrared camera incorporating the etalon can be cited.

Figure 11:
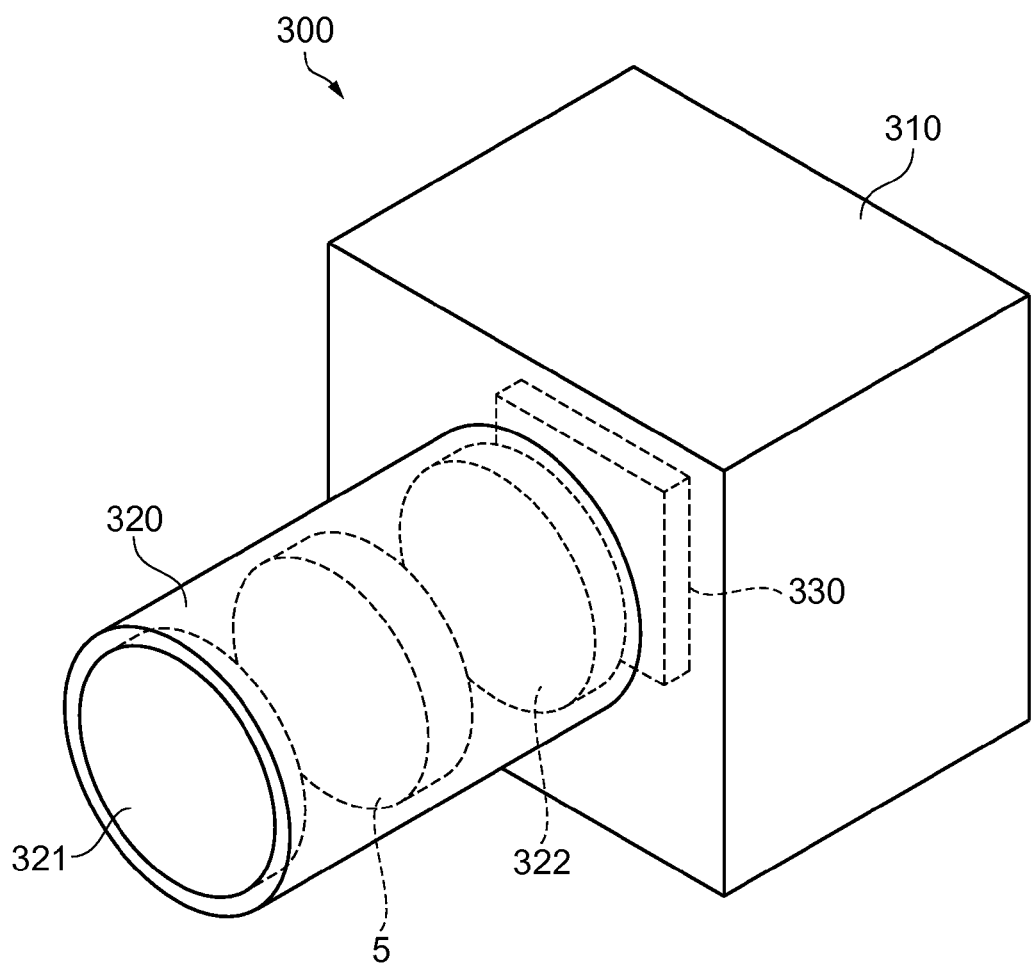
FIG. 11 is a perspective view showing a configuration of a spectroscopic camera as an electronic apparatus according to a sixth embodiment of the invention.

FIG. 11 is a perspective view showing a configuration of the spectroscopic camera. As shown in FIG. 11, the spectroscopic camera 300 is provided with a camera main body 310, an imaging lens unit 320, and an imaging section 330.

The camera main body 310 is a part which is gripped and operated by the user.

The imaging lens unit 320 is provided to the camera main body 310, and guides the image light input thereto to the imaging section 330. Further, the imaging lens unit 320 is configured including an objective lens 321, an image forming lens 322, and the etalon 5 disposed between these lenses.

The imaging section 330 is formed of a light receiving element, and images the image light guided by the imaging lens unit 320.

In such a spectroscopic camera 300, by transmitting the light with the wavelength to be the imaging object using the etalon 5, the spectral image of the light with a desired wavelength can be imaged.

Further, the etalon according to the embodiment of the invention can be used as a band-pass filter, and can also be used as, for example, an optical laser device for dispersing and transmitting only the light with a narrow band centered on a predetermined wavelength out of the light in a predetermined wavelength band emitted by the light emitting element.

Further, the etalon according to the embodiment of the invention can be used as a biometric authentication device, and can be applied to, for example, an authentication device of blood vessels, a fingerprint, a retina, an iris, and so on using the light in a near infrared range or a visible range.

Further, the optical module and the electronic apparatus can be used as a concentration detection device. In this case, the infrared energy (the infrared light) emitted from the substance is dispersed by the etalon and is then analyzed, and the concentration of the test object in a sample is measured.

As described above, the variable wavelength interference filter, the optical module, and the electronic apparatus according to the embodiment of the invention can be applied to any device for dispersing predetermined light from the incident light. Further, since the etalon according to the embodiment of the invention can disperse the light into a plurality of wavelengths with a single device as described above, the measurement of the spectrum of a plurality of wavelengths and detection of a plurality of components can be performed with accuracy. Therefore, compared to the conventional device of taking out desired wavelengths with a plurality of devices, downsizing of the optical module and the electronic apparatus can be promoted, and the optical module and the electronic apparatus can preferably be used for, for example, portable applications and in-car applications.

The invention is not limited to the embodiments explained hereinabove, but the specific structures and the procedures to be adopted when putting the invention into practice can be arbitrarily replaced with other structures and so on within the range in which the advantages of the invention can be achieved. Further, a variety of modifications can be made by those skilled in the art within the scope or the spirit of the invention.

The entire disclosure of Japanese Patent Application No. 2012-007819 filed Jan. 18, 2012 is expressly incorporated by reference herein.

What is claimed is:

1. An interference filter comprising:
a pair of reflecting films opposed to each other across a gap, wherein each of the reflecting films includes an Ag—Sm—Cu alloy film including silver (Ag), samarium (Sm), and copper (Cu),
the Ag—Sm—Cu alloy film includes:
Sm at an amount equal to or higher than 0.1 atomic % and equal to or lower than 0.5 atomic %, and
Cu at an amount equal to or higher than 0.1 atomic % and equal to or lower than 0.5 atomic %,
a sum of the Sm and Cu is equal to or lower than 1.0 atomic %, and
a thickness of the Ag—Sm—Cu alloy film is equal to or larger than 10 nm and equal to or smaller than 40 nm.

2. The interference filter according to claim 1, wherein each of the reflecting films is a single layer film of the Ag—Sm—Cu alloy film.

3. The interference filter according to claim 1, further comprising:
a pair of substrates having a light transmitting property, and adapted to respectively support the reflecting films,
wherein each of the reflecting films includes a dielectric film and the Ag—Sm—Cu alloy film, and
the dielectric film and the Ag—Sm—Cu alloy film are disposed in this order relative to the substrate.

4. The interference filter according to claim 1, wherein each of the reflecting films includes a protective film adapted to protect the Ag—Sm—Cu alloy film.

5. An interference filter comprising:
a pair of reflecting films opposed to each other across a gap, wherein each of the reflecting films includes an Ag—Bi—Nd alloy film including silver (Ag), bismuth (Bi), and neodymium (Nd),
the Ag—Bi—Nd alloy film includes:
Bi at an amount equal to or higher than 0.1 atomic % and equal to or lower than 3.0 atomic %, and
Nd at an amount equal to or higher than 0.1 atomic % and equal to or lower than 5.0 atomic %, and
a thickness of the Ag—Bi—Nd alloy film is equal to or larger than 10 nm and equal to or smaller than 40 nm.

6. The interference filter according to claim 5, wherein each of the reflecting films is a single layer film of the Ag—Bi—Nd alloy film.

7. The interference filter according to claim 5, further comprising:
a pair of substrates having a light transmitting property, and adapted to respectively support the reflecting films,
wherein each of the reflecting films includes a dielectric film and the Ag—Bi—Nd alloy film, and
the dielectric film and the Ag—Bi—Nd alloy film are disposed in this order relative to the substrate.

8. The interference filter according to claim 5, wherein each of the reflecting films includes a protective film adapted to protect the Ag—Bi—Nd alloy film.

9. An optical module comprising:
a pair of reflecting films opposed to each other across a gap; and
a detection section adapted to detect an intensity of light transmitted through the reflecting film,
wherein each of the reflecting films includes an Ag—Sm—Cu alloy film including silver (Ag), samarium (Sm), and copper (Cu),
the Ag—Sm—Cu alloy film includes:
Sm at an amount equal to or higher than 0.1 atomic % and equal to or lower than 0.5 atomic %, and
Cu at an amount equal to or higher than 0.1 atomic % and equal to or lower than 0.5 atomic %,
a sum of the Sm and Cu is equal to or lower than 1.0 atomic %, and
a thickness of the Ag—Sm—Cu alloy film is equal to or larger than 10 nm and equal to or smaller than 40 nm.

10. An optical module comprising:
a pair of reflecting films opposed to each other across a gap; and
a detection section adapted to detect an intensity of light transmitted through the reflecting film,
wherein each of the reflecting films includes an Ag—Bi—Nd alloy film including silver (Ag), bismuth (Bi), and neodymium (Nd),
the Ag—Bi—Nd alloy film includes:
Bi at an amount equal to or higher than 0.1 atomic % and equal to or lower than 3.0 atomic %, and
Nd at an amount equal to or higher than 0.1 atomic % and equal to or lower than 5.0 atomic %, and
a thickness of the Ag—Bi—Nd alloy film is equal to or larger than 10 nm and equal to or smaller than 40 nm.

11. An electronic apparatus comprising:
a pair of reflecting films opposed to each other across a gap;
a detection section adapted to detect an intensity of light transmitted through the reflecting film; and
a processing section adapted to perform an analysis process based on the intensity of the light detected by the detection section,
wherein each of the reflecting films includes an Ag—Sm—Cu alloy film including silver (Ag), samarium (Sm), and copper (Cu),
the Ag—Sm—Cu alloy film includes:
Sm at an amount equal to or higher than 0.1 atomic % and equal to or lower than 0.5 atomic %, and
Cu at an amount equal to or higher than 0.1 atomic % and equal to or lower than 0.5 atomic %,
a sum of the Sm and Cu is equal to or lower than 1.0 atomic %, and
a thickness of the Ag—Sm—Cu alloy film is equal to or larger than 10 nm and equal to or smaller than 40 nm.

12. An electronic apparatus comprising:
a pair of reflecting films opposed to each other across a gap;
a detection section adapted to detect an intensity of light transmitted through the reflecting film; and
a processing section adapted to perform an analysis process based on the intensity of the light detected by the detection section, wherein each of the reflecting films includes an Ag—Bi—Nd alloy film including silver (Ag), bismuth (Bi), and neodymium (Nd), the Ag—Bi—Nd alloy film includes:
   Bi at an amount equal to or higher than 0.1 atomic % and equal to or lower than 3.0 atomic %, and
   Nd at an amount equal to or higher than 0.1 atomic % and equal to or lower than 5.0 atomic %, and
a thickness of the Ag—Bi—Nd alloy film is equal to or larger than 10 nm and equal to or smaller than 40 nm.

13. An interference filter comprising:
a pair of reflecting films opposed to each other across a gap,
wherein a first one of the pair of reflecting films includes an Ag—Sm—Cu alloy film including silver (Ag), samarium (Sm), and copper (Cu),
a second one of the pair of reflecting films includes an Ag—Bi—Nd alloy film including silver (Ag), bismuth (Bi), and neodymium (Nd), the Ag—Sm—Cu alloy film includes:
   Sm at an amount equal to or higher than 0.1 atomic % and equal to or lower than 0.5 atomic %, and
   Cu at an amount equal to or higher than 0.1 atomic % and equal to or lower than 0.5 atomic %,
a sum of the Sm and Cu is equal to or lower than 1.0 atomic %,
a thickness of the Ag—Sm—Cu alloy film is equal to or larger than 10 nm and equal to or smaller than 40 nm,
the Ag—Bi—Nd alloy film includes:
   Bi at an amount equal to or higher than 0.1 atomic % and equal to or lower than 3.0 atomic %, and
   Nd at an amount equal to or higher than 0.1 atomic % and equal to or lower than 5.0 atomic %, and
a thickness of the Ag—Bi—Nd alloy film is equal to or larger than 10 nm and equal to or smaller than 40 nm.

\* \* \* \* \*